(12) United States Patent  
Roscoe

(10) Patent No.: US 8,920,279 B2  
(45) Date of Patent: Dec. 30, 2014

(54) DIFFERENTIAL CASE ASSEMBLY WITH DRIVE RING GEAR

(71) Applicant: Dana Automotive Systems Group, LLC, Maumee, OH (US)

(72) Inventor: Charles S. Roscoe, Holland, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/958,723

(22) Filed: Aug. 5, 2013

(65) Prior Publication Data

US 2014/0045638 A1 Feb. 13, 2014

Related U.S. Application Data

(60) Provisional application No. 61/681,178, filed on Aug. 9, 2012.

(51) Int. Cl.
*F16H 48/08* (2006.01)
*F16H 57/02* (2012.01)

(52) U.S. Cl.
USPC .......................... 475/220; 74/606 R; 29/893.2

(58) Field of Classification Search
USPC ................ 74/606 R; 475/220, 230; 29/893.1, 29/893.2
See application file for complete search history.

(56) References Cited

U.S. PATENT DOCUMENTS

| | | |
|---|---|---|
| 1,610,739 A | 12/1926 | Britton |
| 2,775,141 A | 12/1956 | Ronning |
| 2,883,884 A | 4/1959 | Norton |
| 3,344,688 A | 10/1967 | Frost |
| 5,320,587 A | 6/1994 | Bodtker et al. |
| 6,068,571 A | 5/2000 | Irwin |
| 6,883,235 B2 * | 4/2005 | Bell ............................ 29/893.1 |
| 6,949,046 B2 | 9/2005 | Bell |
| 7,231,847 B2 * | 6/2007 | Hibbler et al. .............. 74/606 R |
| 7,470,207 B2 | 12/2008 | Todd et al. |
| 8,480,531 B2 * | 7/2013 | Pan et al. ....................... 475/230 |
| 2005/0085330 A1 | 4/2005 | Bell |
| 2008/0227581 A1 | 9/2008 | Catalano et al. |
| 2009/0105031 A1 | 4/2009 | Sefcik et al. |
| 2011/0250070 A1 | 10/2011 | Demtroder |
| 2012/0149522 A1 | 6/2012 | Isken, II et al. |
| 2012/0264559 A1 * | 10/2012 | Mayr et al. .................... 475/220 |

FOREIGN PATENT DOCUMENTS

| | | |
|---|---|---|
| EP | 1719572 A2 | 11/2006 |
| WO | 9958287 | 11/1999 |
| WO | 2010086704 A1 | 8/2010 |

* cited by examiner

*Primary Examiner* — Roger Pang
(74) *Attorney, Agent, or Firm* — Marshall & Melhorn, LLC

(57) ABSTRACT

A differential case assembly, which has a case shoulder and a case outside diameter, is attached to a drive ring gear, which has a gear shoulder and a gear inside diameter. Attachment of the differential case assembly to the drive ring gear is by way of pressing the case outside diameter into intimate contact with the drive ring gear inside diameter around the circumference of the diameters, until the case shoulder comes into intimate mating contact with the gear shoulder, at a joint radius. In addition, hardened dowel pins are tightly fit into joint voids that are formed along the joint radius. The hardened dowel pins are capable of supporting an operational torsional load and the mating shoulders are capable of supporting an operational axial load.

20 Claims, 2 Drawing Sheets

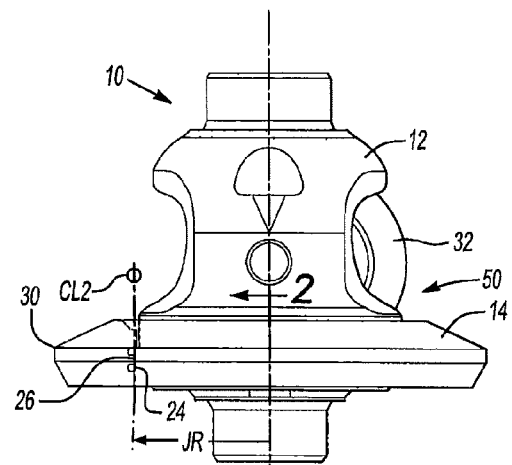
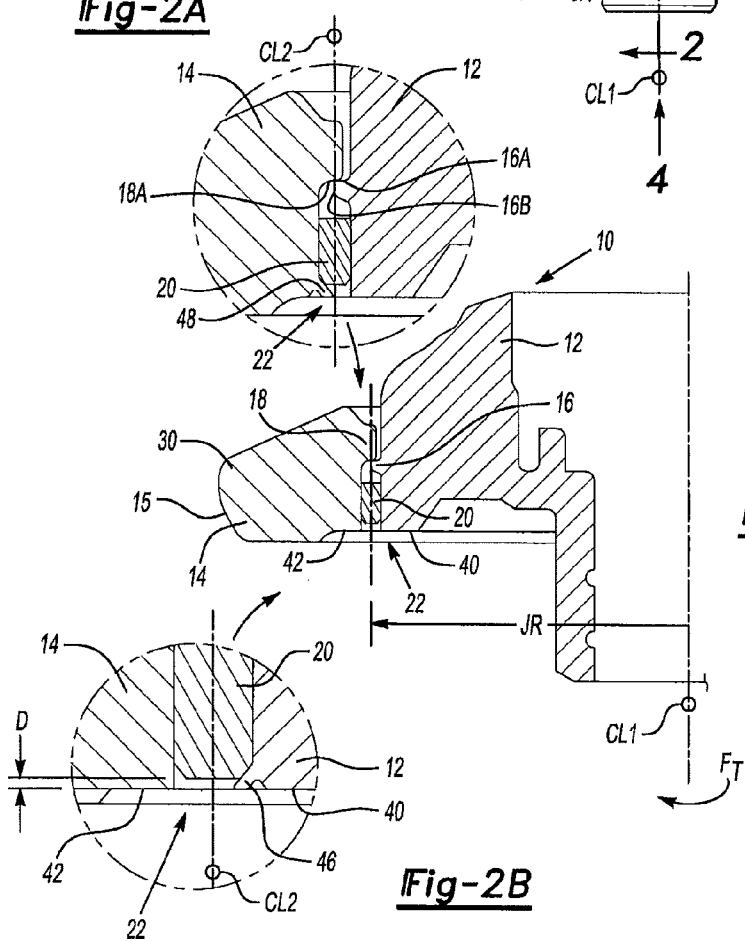

DIFFERENTIAL CASE ASSEMBLY WITH DRIVE RING GEAR

RELATED APPLICATION

This application claims the benefit under 35 U.S.C. §119(e) of U.S. Provisional Patent Application Ser. No. 61/681,178, filed Aug. 9, 2012, which is incorporated by reference herein in its entirety.

FIELD OF THE INVENTION

The present invention relates to a differential case assembly. More particularly, the present invention relates to an attachment of an automotive differential case assembly to a drive ring gear.

BACKGROUND OF THE INVENTION

In a vehicle, a differential is part of a power train. The differential employs gears that are driven by an input drive shaft. The gears are connected to two output drive shafts. In this manner, torque and rotation are transmitted from an engine to wheels.

Typically, a drive ring gear assembly, which comprises a matched set of a drive ring gear and pinion gear, is attached to a differential carrier. The drive ring gear is driven by the pinion gear, which is connected to the input drive shaft. The drive ring gear mechanically passes the input torque and rotation from the pinion gear onto the wheels. The drive ring gear may be a hypoid gear type having spiral bevel teeth that are helical in shape. The helical design of the hypoid shaped drive ring gear produces less vibration and noise than conventional straight-cut or spur-cut gears with straight teeth.

In the past, the drive ring gear had been connected to the differential case assembly by way of many special large drive bolts utilizing loose fit clearance holes in the differential case and tapped holes in the drive ring gear. In this regard, it has been found that only two of the special large drive bolts may actually be in contact with the loose fit clearance differential case holes, thereby only two of the bolts are actually carrying the full operational torsional load.

Other means of connecting the drive ring gear to the differential case assembly are by way of standard welding or brazing. More recently, the drive ring gear is connected to the differential case assembly by way of laser welding.

Specifically, laser welding is known for high power density (on the order of 1 MW/cm$^2$) which results in small heat-affected zones with high heating and subsequently rapid cooling rates. The spot size of such laser welds can vary between 0.2 mm and 13 mm, though only the smaller sizes are typically used for welding. The depth of penetration of the laser welds is proportional to the amount of power supplied, but is also dependent on the location of the focal point; penetration being maximized when the focal point is slightly below the surface of the work piece.

A continuous or pulsed laser beam may be used, depending upon the application. Milliseconds long laser beam pulses are used to weld thin materials, while continuous laser beams are employed for deep welds, like those required for a thick drive ring gear.

As a result, the quality of laser welds themselves is high, where the speed of welding is proportional to the amount of power supplied, which highly depends on the type and thickness of the work pieces. The high power capability of gas lasers, however, makes them especially suitable for high volume applications. Consequently, laser welding is particularly dominant for automotive parts, where carbon steels, high-strength low-alloy (HSLA) steels, stainless steel, aluminum, and titanium may be laser welded.

With increased usage of laser welding techniques to attach the drive ring gear to the differential case assembly, the many special drive bolts of the past have been eliminated. However, due to the high weld temperatures and rapid cooling rates associated with laser welding, the drive ring gear can become distorted. For example, the back face of the drive ring gear can become concave as it cools following laser welding of the drive ring gear to the differential case assembly.

Unfortunately, distortion from laser welding is not truly correctable since the hypoid tooth form of the drive ring gear is typically not ground, but instead is finished machined and lapped only. As a result, the tightly held dimensions expected of the gear teeth are distorted, which causes the vehicle differential to not operate properly and/or may result in noisy operation.

Consequently, it would be beneficial to utilize a means, other than laser welding, to attach the drive ring gear to the differential case assembly. This means must not distort the dimensions of the gear teeth and should not require the use of expensive drive bolts (which do not distribute the operational torsional load equally), tapped holes, and associated additional labor costs.

SUMMARY OF THE INVENTION

A differential case assembly comprises a differential case, which has a case shoulder and case outside diameter, and a drive ring gear, which has a gear shoulder and a gear inside diameter. Attachment of the differential case to the drive ring gear is by way of the case outside diameter being pressed into intimate contact with the gear inside diameter, at a joint radius, until the case shoulder comes into intimate contact with the gear shoulder. Also, a plurality of joint voids is formed along the joint radius wherein dowel pins, preferably hardened, are tightly fit into corresponding joint voids. Consequently, the dowel pins are capable of supporting an operational torsional load without relying on expensive drive bolts and associated tapped holes.

Further objects and advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 1 is a side view of a differential case assembly with a drive ring gear in mating contact with a pinion gear in accordance with the present invention;

FIG. 2 is an enlarged cross sectional view of a portion of the differential case assembly with the drive ring gear along the lines 2-2 of FIG. 1;

FIG. 2A is an inset view of a first portion of FIG. 2;

FIG. 2B is an inset view of a second portion of FIG. 2;

DESCRIPTION OF THE INVENTION

Figure 3:
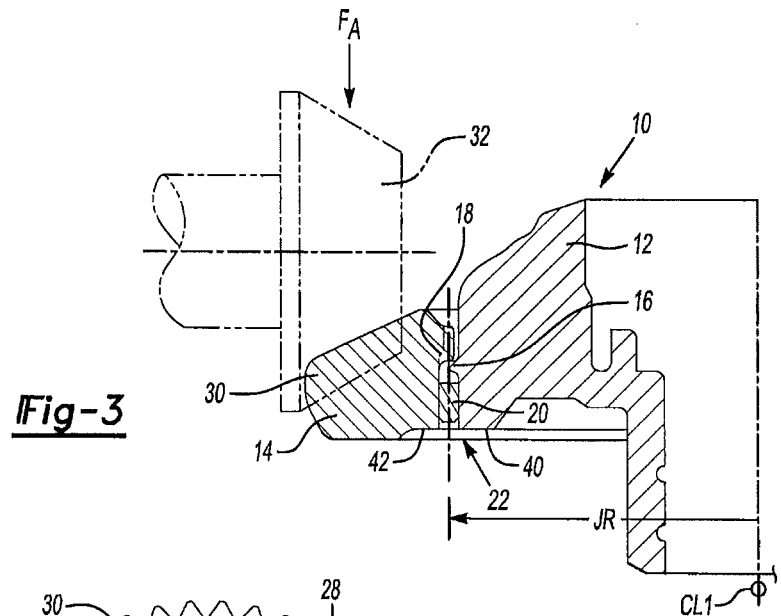
FIG. 3 is FIG. 2 with a phantom pinion gear in meshing contact with the drive ring gear.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

FIG. 1 illustrates a differential case assembly 10 having a differential case 12 and a drive ring gear 14 with a first center line CL1 therethrough. FIG. 2 illustrates a section of the differential case assembly 10 with the drive ring gear 14 along the lines 2-2 of FIG. 1. The differential case 12 has a differential case shoulder 16 that is in intimate contact with the drive ring gear 14 at a drive ring gear shoulder 18. The drive ring gear 14 has a tapered outside diameter 15 and the drive ring gear 14 may be a hypoid gear type having spiral bevel teeth that are helical in shape.

As shown in FIG. 2, the differential case shoulder 16 is directed radially outwardly away from the first center line CL1, while the drive ring gear shoulder 18 is directed radially inward toward the first center line CL1. The differential case shoulder 16 is below the drive ring gear shoulder 18. The shoulders 16, 18 are disposed circumferentially about the first center line CL1. The differential case shoulder 16 is a unitarily formed protrusion of the differential case 12. The drive ring gear shoulder 18 is a unitarily formed protrusion of the drive ring gear 14.

As shown in FIG. 2A, a lower surface 18A of the drive ring gear shoulder 18 overlaps and makes intimate contact with an upper surface 16A of the differential case shoulder 16. The radially inwardly extending drive ring gear shoulder 18 spans a second center line CL2, while a radially outer extended surface 16B of the differential case shoulder 16 is at the second centerline CL2.

Figure 4:
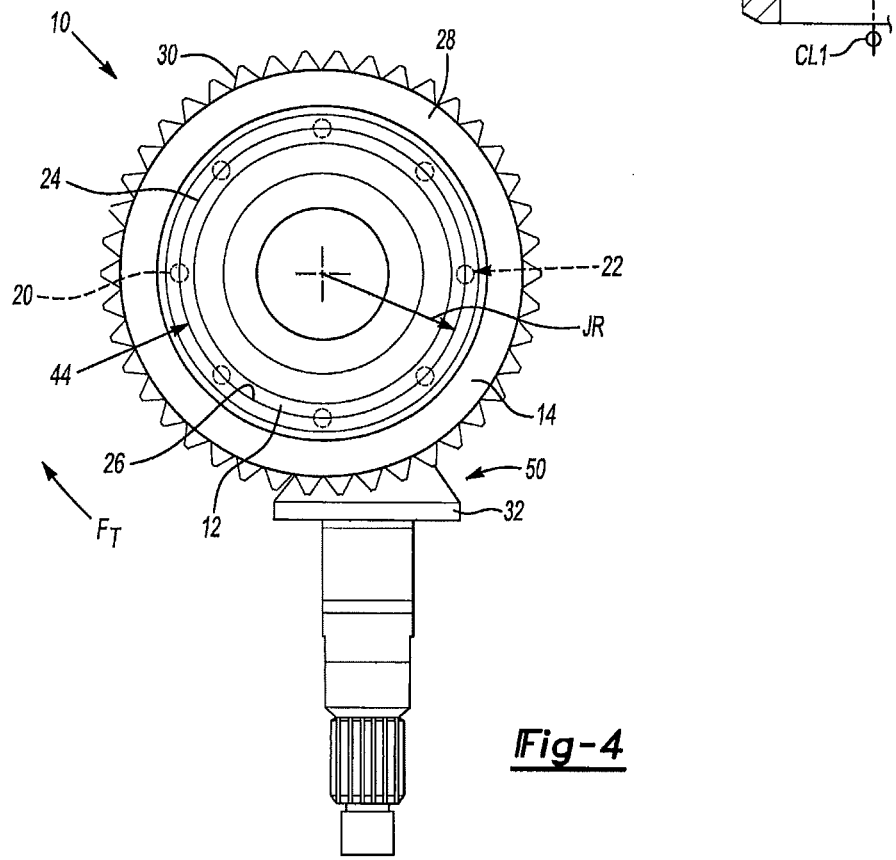
FIG. 4 is a plan view in the direction of the arrow 4 of FIG. 1.

Shown in FIGS. 2, 2A, 2B, 3 and 4 is one of a plurality of dowel pins 20, for example, eight circumferentially distributed pins 20 that are disposed in joint voids 22 that are formed along a joint radius JR (i.e., as can be seen in the FIGS. 1-4, is a radius from the center CL1 of differential case 12 to the second centerline CL2) which may be distributed equally. The distribution of the voids 22 about the differential case 12 are illustrated in FIG. 4. The dowel pins 20 are preferably hardened steel and may be tapered on one end or on both ends.

The joint voids 22 are formed between the differential case 12 and the drive ring gear 14 so as to allow the two parts 12, 14 to cooperate by way of the dowel pins 20, in being joined together. The joint voids 22 may be formed between the differential case 12 and the drive ring gear 14 prior to or following assembly of the case 12 to the drive ring gear 14.

The cooperation between the dowel pins 20 and the joint voids 22 results in a tight fit (e.g., interference fit) therebetween so as to strongly attach the differential case 12 to the drive ring gear 14. Consequently, no special large drive bolts with corresponding tapped holes are required nor would brazing, standard welding, or laser welding be required.

As shown, the dowel pins 20 are solid and cylindrical in shape. However, the present invention is not limited by the shape and cross section of the dowel pins 20, as long as the dowel pins 20 tightly fit into corresponding joint voids 22. The height and width of the dowel pins 20 and the joint voids 22 depend on the size and weight of the differential case 12, the drive ring gear 14, and forces applied to the case 12 and drive ring gear 14. Preferably, the gear shoulder 18 and the case shoulder 16 are burr and chip free.

FIGS. 1 and 4 show the joint radius JR being at a case outside diameter (OD) 24 of the differential case 12, which is in intimate contact with a gear inside diameter (ID) 26 of the drive ring gear 14. Both the case OD 24 and the gear ID 26 are approximately equal to twice the joint radius JR of the differential case assembly 10. In FIG. 1, the case OD 24 and gear ID 26 are shown abutting each other since there is no joint void 22 formed on the joint radius JR in that portion of the differential case assembly 10.

In FIGS. 2, 2A, 2B, and 3, however, the joint void 22 is shown with the dowel pin 20 disposed therein. Consequently, the joint radius JR coincides with a second center line CL2 of the joint void 22.

FIG. 2B illustrates the differential case 12 with attached drive ring gear 14, where the differential case 12 has a case face 40 and the drive ring gear 14 has a gear face 42, the two faces 40, 42 being radially in line with each other to form a common flush surface 44, as seen in FIG. 4. The common flush surface 44 thus, is suitable for drilling and reaming the joint voids 22 around the circumference of the common flush surface 44. Also, each of the joint voids 22 may have a depth D (see FIG. 2B) to allow the dowel pins 20 to be recessed within corresponding joint voids 22 and the case, gear, or both to be staked over the joint voids 22 to retain the dowel pins 20. Consequently, optional stakes 46, 48 (see FIGS. 2B, 2A) may be provided that would be crimped below assembled dowel pins 20 to assure that the dowel pins 20 would not back out of corresponding joint voids 22.

Consequently, the plurality of dowel pins 20, which are disposed in their corresponding joint voids 22, are capable of supporting an operational torsional load $F_T$, as seen in FIGS. 2 and 4. As seen in FIG. 3, the mating shoulders 16, 18 are capable of supporting an operational axial load $F_A$ that is presented to the differential case assembly 10 by an input pinion gear 32 that is shown in phantom and which may be a spiral bevel gear.

Typically, the input pinion gear 32 is helical in shape that meshes with the output drive ring gear 14, which is a corresponding hypoid gear type having spiral bevel teeth that are helical in shape. The input pinion gear 32 and the output drive ring gear 14 are a matched gear set 50 as depicted in FIGS. 1 and 4.

FIG. 4 is a view of the differential case assembly 10, with the attached drive ring gear 14, in the direction of the arrow 4 of FIG. 1. In this view, the differential case assembly 10 is shown with the case OD 24 in intimate contact with the gear ID 26 along the joint radius JR, except where the joint voids 22 are formed. Also shown is the drive ring gear back face 28 along with drive ring gear teeth tips 30 that are barely seen over the gear back face 28, since the tapered outside diameter 15 of the drive ring gear 14 itself is directed away from the view in FIG. 4. The pinion gear 32 cooperates with the drive ring gear 14 to transfer torque and rotation from a driveshaft (not shown but common in the art), through the differential case assembly 10, and then on to wheels (not shown but common in the art).

The differential case assembly 10 is assembled by pressing the case outside diameter OD 24 into intimate contact with the gear inside diameter ID 26, therearound the circumference of the diameters 24, 26, until the case shoulder 16 comes into intimate mating contact with the gear shoulder 18, at the joint radius JR. The plurality of joint voids 22 are formed along the joint radius JR and hardened dowel pins 20 are disposed in each of the joint voids 22, wherein the harden dowel pins 20 are capable of supporting the operational torsional load $F_T$ placed on the differential case assembly 10 and the mating shoulders 16, 18 are capable of supporting the operational axial load $F_A$.

During assembly of the differential case assembly 10, the forming of the joint voids 22 may be done either prior to or after pressing the case 12 and drive ring gear 14 into intimate contact. In FIG. 4, the joint voids 22 are shown as hidden to indicate that the voids 22 may be correspondingly formed before or after pressing the case 12 and drive ring gear 14 into intimate contact. Also, the placement of the joint voids 22 may be equally radially spaced around the joint radius JR, but such a placement is not required.

The assembly of the instant invention 10 is achieved using low cost hardened dowel pins 20 that distribute the operational torsional load $F_T$ and which make contact with the case 12 and drive ring gear 14 utilizing distributed press fits, thereby sharing in the operational torsional load $F_T$ more equally. This compares to expensive drive bolts, which typically do not distribute an operational torsional load, and associated tapped holes that require added labor costs.

Unlike a laser welded assembly, the instant differential case assembly 10, with case 12 and drive ring gear 14, is thermal distortion free due to not being exposed to high temperature welding and/or rapid cooling, which can fracture the case 12 and drive ring gear 14 of the differential case assembly 10. Also, the present assembly 10 requires no expensive drive bolts and tapped drive bolt holes, results in less labor costs, and the back face 28 of the drive ring gear 14 does not become concave as a result of assembling the drive ring gear 14 to the differential case 12.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A differential case assembly with attached drive ring gear, comprising:
   a differential case having a case shoulder and a case outside diameter;
   a drive ring gear having a gear shoulder and a gear inside diameter, the case shoulder in intimate mating contact with the gear shoulder and the case outside diameter in intimate contact with the gear inside diameter at a joint radius, wherein a plurality of joint voids are formed along the joint radius; and
   a plurality of dowel pins disposed in the plurality of joint voids and capable of supporting an operational torsional load and the intimate mating shoulders capable of supporting an operational axial load.

2. The differential case assembly with attached drive ring gear of claim 1, wherein the case has a case face and the drive ring gear has a gear face, the two faces being radially in line with each other so as to form a common flush radially in line surface.

3. The differential case assembly with attached drive ring gear of claim 1, wherein the dowel pins are hardened and each of the joint voids have a depth to allow the dowel pins to be recessed within respective joint voids, and the differential case, drive ring gear, or both have stakes capable of being staked over the joint holes.

4. The differential case assembly with attached drive ring gear of claim 1, wherein the plurality of dowel pins comprises hardened steel that are circumferentially spaced along the joint radius.

5. The differential case assembly with attached drive ring gear of claim 4, wherein the joint voids are spaced equally radially along the joint radius.

6. The differential case assembly with attached drive ring gear of claim 1, wherein the differential case shoulder comprises a unitarily formed protrusion of the differential case and the drive ring gear shoulder comprises a unitarily formed protrusion of the drive ring gear.

7. The differential case assembly with attached drive ring gear of claim 1, further comprising a helical shaped input pinion gear meshed with a hypoid output drive ring gear having helical shaped spiral bevel teeth.

8. The differential case assembly with attached drive ring gear of claim 1, wherein a differential case assembly is free of thermal distortion.

9. The differential case assembly with attached drive ring gear of claim 1, wherein the joint voids are formed prior to the intimate mating contact between the gear shoulder and the case outside diameter being in intimate contact with the gear inside diameter at the joint radius.

10. A method of assembling a differential case assembly to a drive ring gear, comprising:
    providing a differential case having a case shoulder and a case outside diameter;
    providing a drive ring gear having a gear shoulder and a gear inside diameter, wherein the case outside diameter and the gear inside diameter are approximately equal to twice a joint radius of a differential case assembly;
    pressing the case outside diameter into intimate contact with the gear inside diameter until the case shoulder comes into intimate mating contact with the gear shoulder;
    forming a plurality of joint voids along the joint radius; and
    disposing a dowel pin in each of the joint voids, wherein the dowel pins are capable of supporting an operational torsional load placed on the differential case assembly and the intimate mating shoulders capable of supporting an operational axial load.

11. The method of assembling a differential case assembly to a drive ring gear of claim 10, wherein the case has a case face and the drive ring gear has a gear face, the two faces being radially in line with each other, thereby forming a common flush surface for drilling and reaming the joint voids.

12. The method of assembling a differential case assembly to a drive ring gear of claim 10, further comprising providing hardened dowel pins, wherein the forming of the joint voids comprises drilling and reaming the joint voids to a depth so as to allow the dowel pins to be recessed within corresponding joint holes, thereby allowing the case, gear, or both to be staked over the joint holes and retaining the dowel pins within the joint voids.

13. The method of assembling a differential case assembly to a drive ring gear of claim 10, further comprising circumferentially spacing a plurality of hardened steel dowel pins along the joint radius.

14. The method of assembling a differential case assembly to a drive ring gear of claim 13, further comprising equally radially spacing the joint voids along the joint radius.

15. The method of assembling a differential case assembly to a drive ring gear of claim 10, further comprising forming the joint voids after pressing the case outside diameter into intimate contact with the gear inside diameter until the case shoulder comes into intimate mating contact with the gear shoulder.

16. The method of assembling a differential case assembly to a drive ring gear of claim 10, further comprising forming the joint voids prior to pressing the case outside diameter into intimate contact with the gear inside diameter until the case shoulder comes into intimate mating contact with the gear shoulder.

17. The method of assembling a differential case assembly to a drive ring gear of claim 10, further comprising unitarily forming a protrusion on the differential case shoulder and unitarily forming a protrusion on the drive ring gear.

18. The method of assembling a differential case assembly to a drive ring gear of claim 10, further comprising meshing a helical shaped input pinion gear with a hypoid output drive ring gear having helical shaped spiral bevel teeth.

19. The method of assembling a differential case assembly to a drive ring gear of claim 10, further comprising transferring torque and rotation from a driveshaft through the differential case assembly and on to wheels, by way of a pinion gear cooperating with the drive ring gear.

20. The method of assembling a differential case assembly to a drive ring gear of claim 10, providing an assembly of the differential case to the drive ring gear that is free of thermal distortion.

\* \* \* \* \*